Figure 1:
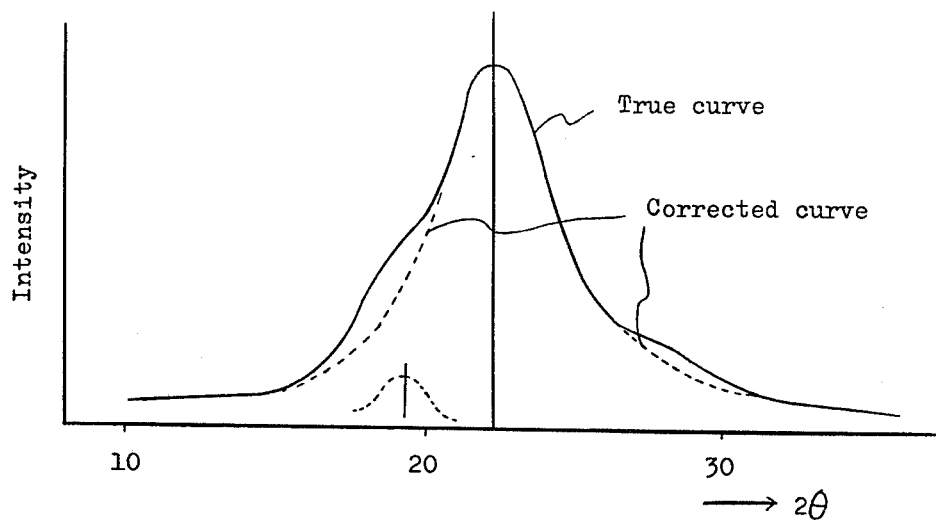

United States Patent [19]

Konomi et al.

[11] 4,011,203

[45] Mar. 8, 1977

[54] AROMATIC POLYAMIDE FROM PIPERAZINE, p-PHENYLENE DIAMINE AND TEREPHTHALOYL HALIDE

[75] Inventors: Tuyoshi Konomi; Keiji Yukimatsu; Kenichi Katsuo; Masayasu Yamaguchi, all of Otsu, Japan

[73] Assignee: Toyobo Co., Ltd., Osaka, Japan

[22] Filed: Dec. 19, 1974

[21] Appl. No.: 534,475

[30] Foreign Application Priority Data

Dec. 19, 1973 Japan .......................... 48-143099

[52] U.S. Cl. ..................... 260/78 R; 260/30.6 R; 260/30.8 R; 260/32.6 NA

[51] Int. Cl.² ...................................... C08G 69/32

[58] Field of Search ................................ 260/78 R

[56] References Cited

UNITED STATES PATENTS 2,913,433  11/1959  Wittbecker et al. ............. 260/78 R

*Primary Examiner*—Harold D. Anderson
*Attorney, Agent, or Firm*—Birch, Stewart, Kolasch and Birch

[57] ABSTRACT

A process for producing novel aromatic polyamides having excellent heat resistance, toughness and chemical resistance and further having improved solubility, molding properties and light resistance, which comprises polycondensing a mixed diamine consisting of piperazine and p-phenylenediamine with a substantially equimolar amount of terephthaloyl dihalide in at least one amide type polar solvent (e.g. hexamethylphosphoramide, N-methyl-2-pyrrolidone, alone or a mixture thereof), wherein said piperazine is contained in a ratio of 10 to 35 % by mol on the basis of the whole mixed diamine component, and fibers produced from the aromatic polyamides having high tenacity, flexing characteristics and wear resistance and further having improved elongation ratio, knot tensile strength, fatigue resistance and fibrillation resistance.

10 Claims, 2 Drawing Figures

AROMATIC POLYAMIDE FROM PIPERAZINE, p-PHENYLENE DIAMINE AND TEREPHTHALOYL HALIDE

The present invention relates to a process for producing novel aromatic polyamides having excellent heat resistance, toughness and chemical resistance and further having improved solubility, molding properties and light resistance, and fibers produced from the polyamides which have high tenacity, flexing characteristics and wear resistance and further have improved elongation ratio, knot tensile strength, fatique resistance and fibrillation resistance. More particularly, it relates to a process for producing the aromatic polyamides comprising the polycondensation of a mixed diamine consisting of piperazine and p-phenylenediamine with a terephthalic dihalide, and fibers produced therefrom.

There have, hitherto, been known various aromatic polyamides which are useful for producing shaped articles such as fibers and films having excellent heat resistance, toughness and chemical resistance, and certain polyamides have been produced on an industrial scale. These polyamides have excellent physical and chemical properties, but on the other hand, they have some difficulties in the steps of the production thereof and of the processing into shape articles such as fibers and films.

For instance, in the step of the production thereof, the solvent used in the reaction is limited to a specific one because of the poor solubility of the aromatic polyamides into an organic solvent. Particularly, para-substituted type wholly aromatic polyamides are hardly soluble even in a specific polar solvent, such as N-methyl-2-pyrrolidone, N,N-dimethylacetamide, N,N-dimethylformamide or dimethyl sulfoxide, and when the polymerization reaction is carried out in such a solvent, the reaction system is solidified within a short period after the initiation of the polymerization reaction, and thereby, the agitation of the system can not be continued. Thus, such wholly aromatic polyamides can hardly be produced continuously and on an industrial scale.

Moreover, in the step of processing into shaped articles, the solvent is limited to a specific one, too. That is, the processing is usually carried out by a wet or dry process, wherein a highly concentrated solution of the polyamides is required for obtaining an article having good physical and chemical properties. However, the aromatic polyamides, particularly the para-substituted type wholly aromatic polyamides, have a poor solubility into organic solvents as mentioned above, and can hardly give a stable solution having a high concentration thereof even by adding thereto an inorganic salt such as lithium chloride or calcium chloride which are known as a solubility promoting agent. Accordingly, the useful solvents are limited to concentrated sulfuric acid or specific fluorine-containing acids.

Besides, the conventional aromatic polyamides have an essential defect of low light resistance and further the fibers produced therefrom are inferior in the flexing characteristics and wear resistance.

Moreover, it is known that the aromatic polyamide poly(p-phenyleneterephthalamide) produced by polymerizing terephthaloyl dihalide and p-phenylenediamine can give fibers having a far excellent tenacity in comparison with conventional polyesters or the like, but on the other hand, such fibers have defects that they are inferior in the elongation ratio, knot tensile strength or the like. It is generally considered that it is very difficult to improve the elongation ratio, knot tensile strength or the like of the polyamide fibers without lowering the tenacity thereof.

Under the circumstances, the present inventors have carried out intensive studies to find a new aromatic polyamide having excellent heat resistance, toughness and chemical resistance similar to the conventional aromatic polyamides and further having improved solubility, molding properties and light resistance, which can give fibers having high tenacity, flexing characteristics and wear resistance and further having improved elongation ratio, knot tensile strength or the like. As the results, it has been found that the desired polyamide can be produced by copolymerizing piperazine together with the corresponding monomers.

An object of the present invention is to provide a process for producing novel aromatic polyamides containing a piperazinamide bond in the molecule.

Another object of the invention is to provide a novel aromatic polyamide having excellent heat resistance, toughness and chemical resistance and further having improved solubility, molding properties and light resistance.

A further object of the invention is to provide a novel aromatic polyamide which can give fibers having high tenacity, flexing characteristics and wear resistance.

A still further object of the invention is to provide fibers having an improved elongation ratio, knot tensile strength, fatigue resistance and fibrillation resistance without lowering of the tenacity.

These and other objects of the invention will be apparent from the description hereinafter.

A certain aromatic polyamide containing a piperazinamide bond in the molecule has been already described in Japanese Patent Specification 6390/1957. However, the aromatic polyamide is produced by using a diamine composition containing 50 % by mol or more of piperazine or a substituted piperazine, and further, the fibers obtained therefrom have inferior tenacity. That is, the product of Example 53 in the Japanese patent (2,5-dimethylpiperazine : terephthaloyl chloride/isophthaloyl chloride =100 : 80/20) has merely a tenacity of 2.8 g/d at an elongation of 30 %. On the other hand, the aromatic polyamides of the present invention have higher physical and chemical properties, for instance, a tenacity of 7 g/d or more and an initial modulus of 150 g/d or more, and are useful in a tire cord, a plastic reinforcement or the like. Such improvements in the physical and chemical properties of the present polyamides are effected by introducing a small amount of piperazine ring into the main chain of the para-substituted type wholly aromatic polyamides, and the product of the present invention is clearly different from that of the above Japanese patent in the components of the polymer, the physical and chemical properties of the product and the utilities thereof.

According to the present invention, the desired aromatic polyamides can be produced by polycondensing a mixed diamine consisting of piperazine and p-phenylenediamine with a substantially equimolar amount of terephthalic dihalide in at least one amide type polar solvent, wherein said piperazine is contained in a ratio of 10 to 35 % by mol on the basis of the whole diamine component.

Suitable examples of the amide type polar solvent used in the present invention are hexamethylphosphoramide, N-methyl-2-pyrrolidone, tetramethylurea, N,N-dimethylacetamide, or the like. These may be used alone or in a mixture of two or more thereof. In case of a mixed solvent of hexamethylphosphoramide and N-methyl-2-pyrrolidone, the mixed ratio thereof is preferably in a range of 3 : 1 to 1 : 4, more preferably 2 : 1 to 1 : 3 by volume.

When the conventional aromatic polyamide poly(p-phenyleneteraphthalamide) is produced by using any of the above solvents or a mixed solvent thereof, the reaction system is solidified one or two minutes after the initiation of the polymerization reaction. On the contrary, in case of the copolymer containing a piperazine ring as in the present invention, the solubility thereof is remarkably improved. For instance, when the monomers are polymerized in a mixed solvent of hexamethylphosphoramide : N-methyl-2-pyrrolidone (2 : 1 by volume) (the concentration of the polymer: 0.05 mol/150 – 200 ml), the dope obtained directly from the reaction system can be used, as it is, for producing fibers or films.

The piperazine in the mixed diamine may be preferably contained in a range of 10 to 35 % by mol, more preferably 15 to 20 % by mol on the basis of the whole diamine component. When the amount of piperazine is over 35 % by mol, the obtained product has extremely lowered chemical resistance and other physical and chemical properties. On the other hand, when the amount of piperazine is less than 10 % by mol, it is not effective in improvement of the characteristics (e.g. the elongation ratio and knot tensile strength) of the fibers produced from the copolymer, in other words, the copolymer can not give fibers having an improved elongation ratio and knot tensile strength.

Suitable examples of the terephthaloyl dihalide are terephthaloyl dichloride, terephthaloyl dibromide, or the like. The dichloride compound is the most preferred derivative.

In the process for producing the aromatic polyamides of the present invention, there may be used a small amount of any other copolymerizable monomer than piperazine, p-phenylenediamine and terephthaloyl dihalide. The other copolymerizatable monomers may be m-phenylenediamine, isophthaloyl dihalide, or a polycyclic or condensed polycyclic diamine or dicarboxylic dihalide, such as a diamine or dicarboxylic dihalide derivative of diphenyl compounds (e.g. 4,4'-diphenylmethane, 4,4'-diphenyl ether, 4,4'-diphenylsulfone or 3,3'-diphenylsulfone or naphthalene compounds, which may be substituted by a lower alkyl, a lower alkoxy or a halogen.

The process for producing the aromatic polyamides of the present invention may be carried out as follows:

First of all, the mixed diamine is dissolved in a solvent which is dehydrated, and optionally another additive such as an acid acceptor is added thereto to give a homogeneous diamine solution. The acid acceptor may be usually tertiary amines. Suitable examples of the acid acceptor are trimethylamine, triethylamine, pyridine, N-ethylpiperidine, N-methylpyrrolidine, N,N-dimethylbenzylamine, N-methylmorpholine, N-ethylmorpholine, 2,6-dimethylpyridine, N,N-dimethylaniline, N,N-diethylaniline, triallylamine, diallylmethylamine, allyldimethylamine, N-allylmorpholine, propargyldimethylamine, propargylmethyldimethylamine, propargylethyldimethylamine, dimethylethylamine, methyldiethylamine, dimethyl-n-propylamine, dimethyl-n-butylamine, dimethylisobutylamine, dimethylisopropylamine, tri-n-propylamine, tri-n-butylamine, or the like. The acid acceptor may be used in an amount of not more than 10 % by volume, preferably 5 to 7 % by volume on the basis of the volume of the solvent. A small amount of an alkali or alkaline earth metal salt (e.g. lithium bromide or calcium chloride) may be also added to the solvent for promoting the solubility of the components.

After preparing a homogeneous diamine solution, to the solution is added a terephthaloyl dihalide under stirring and under cooling to −30° to 10° C, preferably −20° to 5° C. The terephthaloyl dihalide is added at once in the form of a fine powder or of a solution in a suitable inert solvent (e.g. tetrahydrofuran, benzene or chloroform). The amide type polar solvents as mentioned hereinbefore may also be used when the solution is used immediately after the preparation. The polymerization reaction proceeds immediately after the addition of terephthaloyl dihalide and then the temperature of the reaction system rises owing to the exothermic reaction. The reaction is usually finished within 0.05 to 4 hours.

The product thus obtained may be separated, for instance, by pouring the reaction mixture into a nonsolvent (e.g. water), and optionally, pulverized by a high-speed blender or the like, and if necessary, further washed with a nonsolvent (e.g. water or methanol) and then dried. The reaction mixture per se may be used as a dope for a spinning or a processing into shaped articles after controlling the concentration thereof.

The degree of polymerization of the desired polymer can be controlled by varying the molar ratio of the mixed diamine and the terephthaloyl dihalide, by adding a predetermined amount of monofunctional amine or acid halide, water or the like to the reaction system, or by controlling the concentration of the monomers.

The polyamides having a high degree of polymerization obtained by the present invention have a high solubility into not only a specific solvent such as sulfuric acid but also an amide type polar solvent such as hexamethylphosphoramide, N-methyl-2-methylacetamide, tetramethylurea and N,N-dimethylacetamide. When sulfuric acid is used for the preparation of a dope, it is preferable to use a 95 % or more concentrated sulfuric acid or fuming sulfuric acid for obtaining a stable solution having no gelled component. When other various diamines are used instead of piperazine, the dope has too high of a viscosity and can not be used for producing fibers.

The present invention provides fibers having high tenacity, flexing characteristics and wear resistance and further having improved elongation ratio, knot tensile strength, fatigue resistance and fibrillation resistance, which is formed from an aromatic polyamide comprising substantially repeating units of the formulae [I] and [II]:

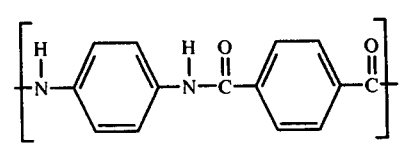

and

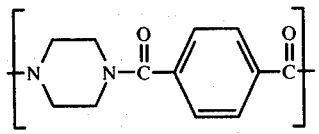
[II]

wherein the repeating units of the formula [II] are contained in a ratio of 10 to 35 % by mol of the whole polymer.

The desired fibers can be produced by spinning the aromatic polyamides obtained above.

The spinning of the polyamides may be carried out by a conventional wet process or an air gap spinning process as described in the specifications of Japanese Patent No. 160942 or Japanese Patent Publication No. 815/1967. For instance, the dope of the polyamides, which is prepared by mixing a homogeneous diamine solution and terephthalic dihalide, subjecting them to copolymerization reaction and admixing the copolymer thus obtained with concentrated sulfuric acid, fuming sulfuric acid or the like as mentioned hereinbefore, is extruded through a spinneret into a solidifying medium (e.g. water). The emerged filaments are preferably poured into the solidifying medium via an air zone, in other words, the emerged filaments are passed through an air zone prior to pouring into the solidifying medium, for giving the desired characteristics to the obtained fibers. The polyamides may preferably be spun under the conditions of the concentration of the polymer: 3 – 30 % by weight; the temperature of the dope used for extrusion: 20°– 100° C; the temperature of the solidifying medium: 0°– 100° C, more preferably 1°– 20° C.

The present invention is illustrated by the following Examples but is not limited thereto.

In the Examples, the inherent viscosity ($\eta$inh) is calculated as follows: The polymer (0.5 g) is dissolved in 96 % sulfuric acid (100 ml) and the relative viscosity ($\eta$rel) is measured at 30° C, and then the inherent viscosity ($\eta$inh) is calculated by the following equation:

$$\eta\text{inh} = \ln (\eta\text{rel})/C$$

wherein C means the concentration of the polymer (g/100 ml) and ln means natural logarithm.

The wear resistance of the filaments is measured by the following friction cohesion test. The filaments are rubbed with each other by using a friction cohesion tester (made by Toyo Seiki K.K.) and then the cohesiveness and wearability of the filaments are tested. The tester includes a sliding truck and a truck which can be fixed on the same rail (the diameter of the trucks: 15 mm; the distance between both trucks: about 60 mm), and the sliding truck is drawn by a loading truck and thereby the filaments are given a tension. The filaments to be tested are turned round the sliding truck and crossed between the sliding truck and the fixed truck and thereby some twists are given to the filaments, and thereafter the twisted filaments are connected with the sliding part of the sliding truck via the surroundings of the fixed truck. The sliding part is reciprocated 100 times per minute at an interval of 30 mm. The cross angle of the filaments can be controlled by sliding the sliding truck to the right and left. The distance of bot trucks (the cross angle of the filament) can be fixed by moving the truck which is able to be fixed. When the test filaments are cut, the switch cuts off. Then, the number of reciprocating motions is counted, and therefrom the wear resistance is evaluated.

The flexing characteristics are evaluated on the basis of the whole results of the knot tensile strength, the wear resistance and the twist resistance.

The I.D. value (Degree of Inperfection) is used for evaluating the turbulence of the crystal structure of the polymer by X-ray diffraction, on which the excellent physical and chemical properties of the present fibers depend. The I.D. value is calculated as follows: The fibers of the invention are put vertically to the X-ray beam and then the equatorial scattering profile is depicted by using the fiber axis as a meridian as shown in FIG. 1. In the curve thus drawn, the peak at the low angle zone is usually unclear, but when in the curve the background and the polarization are corrected and further the incoherent scattering is corrected (cf. L. E. Alexander: X-ray Diffraction Methods in Polymer Science, Wiley-Interscience, 1969) and thereafter it is dissolved into two Gaussian curves (cf. Masao Kakudo and Nobutami Kasai: X-ray Diffraction of High Polymers, issued by Maruzen, 1968), the peak of the low angle zone is actualized. Usually, the two peaks position at 3.70 – 4.30 A and 4.30 – 5.00 A, respectively, which shows by the interplanar spacing, and the former is designated as (200) refraction and the latter is designated as (010/210) refraction, and then the I.D. value is shown by the following equation:

$$\text{I.D. value} = \frac{d\binom{010}{210}}{4.33}$$

wherein $d$ (010/210) means the interplanar spacing of (010/210) (A).

Figure 2:
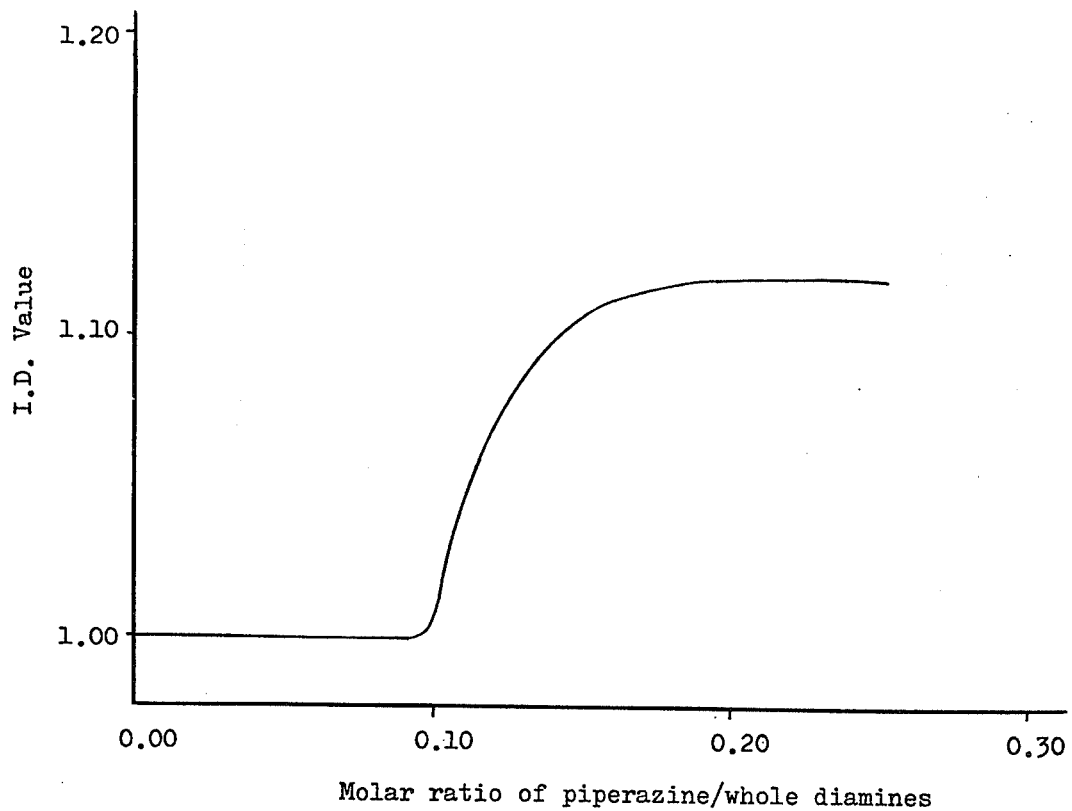

According to the X-ray diffraction of the present fibers, the relation between the I.D. value and the amount of piperazine is shown as in FIG. 2. As is made clear from this figure, in the fibers obtained by spinning the present copolymer, the piperazine ring is taken in the crystalline area of the poly(p-phenyleneterephthalamide), and the interplanar spacing increases together with the increase of the amount of piperazine to be copolymerized. That is, when the turbulence of the crystal structure of the polymer is induced by copolymerizing piperazine, the elongation ratio and the knot tensile strength are increased.

The birefringence ($\Delta$n) is measured by a conventional method (cf. J. F. Rund & R. B. Andrews, Journal of Applied Physics, Vol. 27, page 996, 1956). The fibers of the present invention comprise a highly oriented molecular chain and have usually a birefringence of 0.370 or more.

EXAMPLE 1

A 1 liter glass-made reactor provided with a stirrer, an inlet for introducing dry nitrogen and an outlet thereof, an inlet for adding terephthaloyl dihalide and a thermometer is substituted with dry nitrogen and thereby is made anhydrous. The reactor is charged with powdery p-phenylenediamine (4.596 g; 0.0425 mol), anhydrous piperazine (0.646 g; 0.0075 mol), hexamethylphosphoramide (50 ml) and N-methyl-2-pyrrolidone (90 ml) while passing through a small amount of dry nitrogen. The mixture is stirred at room temperature to give a homogeneous diamine solution. After cooling the diamine solution on an ice bath to 4° C, to the solution is added under stirring at once fine powdery terephthaloyl dichloride (10.152 g; 0.05 mol) by using a funnel with a wide neck and then the remaining terephthaloyl dichloride adhered to the funnel is rapidly flowed down with N-methyl-2-pyrrolidone (10 ml). After the addition of terephthaloyl dichloride, the temperature of the reaction mixture is immediately raised, and after 5 minutes, a clear, viscous and homogeneous dope is obtained. The reaction mixture is stirred and washed with a high-speed mixer together with a large amount of water to give a fine powdery polymer, which is separated by filtration, washed with water and further with alcohol and then dried at 100° C for 16 hours in a vacuum.

The copolymer thus obtained starts to decompose at 460° C in an atmosphere of argon and has an inherent viscosity of 3.08.

EXAMPLE 2

Example 1 is repeated except that triethylamine (2.1 ml; 0.015 mol) is added to the mixed diamine solution. The polymer thus obtained has an inherent viscosity of 3.54.

EXAMPLE 3

In the same manner as described in Example 1, the reaction is carried out by using p-phenylenediamine (4.055 g; 0.0375 mol), anhydrous piperazine (1.077 g; 0.0125 mol), N-methyl-2-pyrrolidone (100 ml), hexamethylphosphoramide (50 ml) and N,N-dimethylaniline (6.3 ml; 0.05 mol). After the addition of terephthaloyl dichloride, the reaction mixture is stirred for 10 minutes to give a clear homogeneous dope. The reaction mixture is treated in the same manner as described in Example 1. The copolymer thus obtained starts to decompose at 445° C in an atmosphere of argon and has an inherent viscosity of 3.19.

EXAMPLE 4

To the copolymer obtained in the same manner as in Example 1 is added 98 % concentrated sulfuric acid and the mixture is stirred at room temperature for 3 hours to give a dope having a concentration of the polymer of 12 % by weight and a viscosity of about 1,800 pois. After de-aerating, the dope is filtered by two filters having 400 mesh. The dope is extruded through a spinneret having 50 orifices under a pressure of nitrogen gas of 3.5 kg/cm² into a solidifying medium (water) of 20° C, washed water at the second bath and then wound up on bobbins.

On the other hand, in the same manner as described above, poly(p-phenyleneterephthalamide) having an inherent viscosity of 3.01 is spun.

The spun filaments obtained above have the characteristics as shown in the following Table 1.

Table 1

| | Copolymer of the present invention | | Poly(p-phenyleneterephthalamide) |
|---|---|---|---|
| | I | II | |
| Conditions for spinning: | | | |
| Diameter of orifice of spinneret (mmφ) | 0.06 | 0.08 | 0.06 |
| Extrusion rate (g/minute) | 2.14 | 2.63 | 2.14 |

Table 1-continued

| | Copolymer of the present invention | | Poly(p-phenyleneterephthalamide) |
|---|---|---|---|
| | I | II | |
| Length of solidifying bath (cm) | 40 | 37 | 40 |
| Speed for winding (m/minute) | 10 | 10 | 10 |
| Characteristics of filaments: | | | |
| Denier (d) | 4.43 | 5.68 | 4.46 |
| Tenacity in dry state (g/d) | 3.81 | 3.22 | 4.57 |
| Elongation ratio (%) | 12.8 | 13.9 | 10.4 |
| Initial modulus (g/d) | 171.3 | 169.5 | 193.2 |
| Knot tensile strength | 1.41 | 1.53 | 1.01 |

The spun filaments (I) are heat-treated at 500° C with drawing at a ratio of 5 % to give fibers having a tenacity in the dry state of 8.37 g/d, an elongation ratio of 3.59 % and an initial modulus of 563.4 g/d.

EXAMPLE 5

The copolymer obtained in the same manner as in Example 3 is dissolved in 98 % concentrated sulfuric acid at room temperature to give a dope having a concentration of the polymer of 12 % by weight and a viscosity of about 1,800 pois. After de-aerating and filtering, the dope is extruded through a spinneret having 50 orifices under a pressure of nitrogen gas of 4 to 4.5 kg/cm² into a solidifying medium (water) of 20° C washed with water at the second bath and then wound up on bobbins. The spun filaments thus obtained have the characteristics as shown in the following Table 2.

Table 2

| Conditions for spinning: | |
|---|---|
| Diameter of orifice of spinneret (mmφ) | 0.06 |
| Extrusion rate (g/minute) | 2.12 |
| Length of solidifying bath (cm) | 40 |
| Speed for winding (m/minute) | 10 |
| Characteristics of filaments: | |
| Denier (d) | 4.36 |
| Tenacity in dry state (g/d) | 3.52 |
| Elongation ratio (%) | 15.2 |
| Initial modulus (g/d) | 159.1 |

The spun filaments are heat-treated at 480° C with drawing at a ratio of 5 % to give fibers having a tenacity in the dry state of 7.26 g/d, an elongation ratio of 4.8 % and an initial modulus of 412 g/d.

EXAMPLE 6

The copolymer having an inherent viscosity of 3.02 obtained in the same manner as in Example 1 is dissolved in 100 % concentrated sulfuric acid at 80° C to give a dope having a concentration of the polymer of 20 % by weight. The dope is warmed at 70° to 85° C during transporting from the tank to a spinneret and extruded through the spinneret having 10 orifices of 0.06 mmφ in diameter under a pressure of nitrogen gas of about 4 kg/cm² into a solidifying medium (water) of about 10° C and wound up on bobbins at a rate of 22 m/minute. The filaments wound on the bobbins are dipped in water overnight and dried at 80° C for 4 hours. The characteristics of the filaments are a denier of 5.37 d, a tenacity in the dry state of 10.56 g/d, and an elongation ratio of 6.7 %, an initial modulus of 282.3 g/d and a knot tensile strength of 2.30 g/d.

In the same manner as described above, poly(p-phenyleneterephthalamide) having an inherent viscosity of 5.1 is treated to give filaments having a denier of 5.39 d, a tenacity in the dry state of 12.79 g/d, an elongation ratio of 4.7 %, an initial modulus of 300.3 g/d and a knot tensile strength of 1.28 g/d.

The filaments obtained from the present copolymer have a gold colored gloss and a high knot tensile strength.

bobbins are dipped in water overnight and dried at 80° C for 4 hours.

In the same manner as described above, poly(p-phenyleneterephthalamide) having an inherent viscosity of 5.07 is extruded into a solidifying medium (cold water) of 2° C and wound up on bobbins at a speed of 200 m/minute.

The filaments thus obtained have the characteristics as shown in the following Table 3. The copolymer of the present invention has high physical and chemical properties and a high knot tensile strength.

Table 3

|  | Winding speed (m/minute) | Denier (d) | Tenacity at dry state (g/d) | Elongation ratio (%) | Initial modulus (g/d) | Knot tensile strength (g/d) | I.D. value | Birefringence (Δn) |
|---|---|---|---|---|---|---|---|---|
| Present copolymer | 120 | 3.97 | 21.05 | 5.1 | 503.6 | 6.75 | 1.12 | 405 × 10⁻³ |
|  | 150 | 3.38 | 20.73 | 4.8 | 497.5 | 6.91 | 1.12 | 408 × 10⁻³ |
|  | 200 | 2.51 | 20.54 | 4.6 | 496.3 | 6.83 | 1.12 | 410 × 10⁻³ |
| Poly(p-phenyleneterephthalamide) | 200 | 2.14 | 23.4 | 3.6 | 640 | 4.96 | 1.00 | 475 × 10⁻³ |

EXAMPLE 7

The copolymer having an inherent viscosity of 3.09 obtained in the same manner as in Example 1 is dissolved in 100 % concentrated sulfuric acid at 85° C to give a dope having a concentration of the polymer of 20 % by weight and a viscosity of 1,100 pois. The dope is extruded through a spinneret having 10 orifices of 0.08 mm$\phi$ in diameter at a speed of 1.6 m/minute into a solidifying medium (cold water) of 5° C via an air zone of about 7 mm in width and then wound up on bobbins at various speeds. The filaments wound on the

EXAMPLE 8

On the product of Example 7 (winding speed: 150 m minute), the heat resistance and light resistance are tested. The results are shown in the following Table 4.

As is made clear from the results, the fibers obtained from the present copolymer have a similar heat resistance to that of the conventional wholly aromatic polyamide at a high temperature area and are superior in the light resistance in comparison with the latter.

Table 4

| | Heat resistance | | | | | | | | |
|---|---|---|---|---|---|---|---|---|---|
| | Strength retaining rate after the heat-treatment (%) | | | | | | Strength retaining rate under heating (%) | | |
| | Treated at 200° C for 100 hours | | | Treated at 300° C for 0.5 hour | | | Heating at 150° C | | |
| | Tenacity at dry state (g/d) | Elongation (%) | Initial modulus (g/d) | Tenacity at dry state (g/d) | Elongation (%) | Initial modulus (g/d) | Tenacity at dry state (g/d) | Elongation (%) | Knot tensile strength (g/d) | Initial modulus (g/d) |
| Copolymer of the present invention | 92.9 | 84.6 | 105 | 85.8 | 63.3 | 112 | 72.0 | 91.8 | 78.9 | 60.9 |
| Poly(p-phenyleneterephthalamide) | 92.0 | 86.5 | 107 | 85.3 | 73 | 137 | 82.9 | 127.0 | 61.2 | 44.0 |

| | Heat resistance | | | | Light resistance | | | | | |
|---|---|---|---|---|---|---|---|---|---|---|
| | Strength retaining rate under heating (%) | | | | Strength retaining rate after the irradiation (%) | | | | | |
| | Heating at 200° C | | | | Irradiating for 40 hours | | | Irradiating for 100 hours | | |
| | Tenacity at dry state (g/d) | Elongation (%) | Knot tensile strength (g/d) | Initial modulus (g/d) | Tenacity at dry state (g/d) | Elongation (%) | Initial modulus (g/d) | Tenacity at dry state (g/d) | Elongation (%) | Initial modulus (g/d) |
| Copolymer of the present invention | 63.4 | 84.8 | 57.9 | 47.5 | 91.8 | 89.8 | 106 | 75.0 | 71.4 | 97.4 |
| Poly(p-phenyleneterephthalamide) | 62 | 124 | 57.5 | 48.6 | 84.5 | 86.5 | 107 | 50.1 | 54.3 | 91.0 |

EXAMPLE 9

The copolymer having an inherent viscosity of 3.59 obtained in the same manner as described in Example 3 is dissolved in 100 % concentrated sulfuric acid at 85° C to give a dope having a concentration of the polymer of 20 % by weight. The dope is extruded through a spinneret having 10 orifices of 0.08 mm$\phi$ in diameter at a speed of 1.6 ml/minute into a solidifying medium (cold water) of 5° C via an air zone of about 7 mm in width and wound up on bobbins at a rate of 120 m/minute and 200 m/minute. The filaments wound on the bobbins are dipped in water overnight and dried at 80° C for 4 hours. The filaments thus obtained have the characteristics as shown in the following Table 5.

Table 5

| Winding speed (m/minute) | Denier (d) | Tenacity at dry state (g/d) | Elongation ratio (%) | Initial modulus (g/d) | Knot tensile strength (g/d) | I.D. value | Birefringence ($\Delta n$) |
|---|---|---|---|---|---|---|---|
| 120 | 3.86 | 16.98 | 5.4 | 435 | 7.01 | 1.12 | $402 \times 10^{-3}$ |
| 200 | 2.48 | 17.85 | 5.1 | 431 | 7.23 | 1.12 | $406 \times 10^{-3}$ |

EXAMPLE 10

On the fibers obtained in Examples 7 and 9, the wear resistance and twist resistance are tested. The results are shown in the following Table 6.

As is made clear from the results, the fibers obtained from the present copolymer are superior in the wear resistance and twist resistance in comparison with the conventional wholly aromatic polyamide.

Table 6

| | Wear resistance Friction cohesion test (Reciprocation number until the filaments being cut) | Twist resistance (multifilaments) Strength retaining rate (%) Number of twist (per 10 cm) | | | |
|---|---|---|---|---|---|
| | | $0 \times 0$ | $30 \times 30$ | $40 \times 40$ | $60 \times 60$ |
| Copolymer of the present invention Example 7 | 21 | 100 | 107.9 | 121.4 | 130.1 |
| Example 9 | 23 | 100 | 105.0 | 123.5 | 133.6 |
| Poly(p-phenyleneterephthalamide) | 13 | 100 | 94.6 | 101.5 | 105.6 |

EXAMPLE 11

A mixed diamine consisting of p-phenylenediamine and a copolymerizable diamine as shown in the following Table 7 is copolymerized with a substantially equimolar amount of terephthaloyl dichloride in a mixed solvent of hexamethylphosphoramide/N-methylpyrrolidone (1 : 1 by weight) to give a polymer having a concentration of the polymer of about 8.0 % and having an intrinsic viscosity [$\eta$] as shown in the Table 7, wherein the initial temperature of the polymerization system is 7° C, the period for the reaction is about 3 hours, and the polymer produced thereby is washed with water (three times) and with methanol (twice), dried at 105° C for 12 hours and further dried at 12 mmHg for 12 hours.

A 180 ml three necked flask is charged with the polymer obtained above (20 g), and thereto is added 100 % concentrated sulfuric acid (80 g) and the mixture is stirred at 85° C for 2 hours to give a dope having a concentration of the polymer of 20 % by weight. The viscosity of the dope is measured by a BH type viscometer (made by Tokyo Keiki K. K. ). The results are shown in the Table 7.

Table 7

| Copolymerizable diamine | Content of the copolymerizable diamine in the mixed diamine (% by mol) | Intrinsic viscosity [$\eta$] of the polymer | Viscosity of the dope (poise) | |
|---|---|---|---|---|
| Piperazine | 10 | 3.67 | 1080 | |
| | 15 | 4.20 | 1200 | |
| | 20 | 3.50 | 2030 | |
| Diaminodiphenylmethane | 10 | 3.72 | 4500 | |
| | 20 | 3.51 | Impossible to measure | |
| Diaminodiphenyl ether | 10 | 3.53 | 6580 | |
| | 20 | 2.42 | Impossible to measure | ($>10^4$) |
| Diaminodiphenylsulfoxide | 10 | 2.90 | 5600 | |
| | 20 | 3.24 | Impossible to measure | ($>10^4$) |
| Diaminodiphenyl ketone | 10 | 3.21 | 5850 | |
| | 20 | 3.10 | Impossible to measure | ($>10^4$) |
| m-Phenylenediamine | 15 | 3.41 | 5215 | |
| m-Xylenediamine | 15 | 2.82 | 6710 | |
| 1,3-Cyclohexylenediamine (cis) | 15 | 3.10 | 5521 | |
| 1,3-Cyclohexylenebismethylamine (cis) | 15 | 2.72 | 7012 | |
| 2,5-Bis(p-aminobenzoyl)-1,3,4- | 15 | 3.24 | 5010 (Partially | |

Table 7-continued

| Copolymerizable diamine | Content of the copolymerizable diamine in the mixed diamine (% by mol) | Intrinsic viscosity [η] of the polymer | Viscosity of the dope (poise) |
|---|---|---|---|
| oxadiazole | | | decomposed) |
| 2,5-Bis(m-amino-benzoyl)-1,3,4-oxadiazole | 15 | 3.05 | 4818 (Partially decomposed) |
| 1,3,4-Oxadiazole-2,5-bis(3-benzoic acid) dichloride | 15 | 3.14 | 5130 (Partially decomposed) |
| 5,5'-Di(3-amino-phenyl)-2,2'-bis-(1,3,4-oxadiazolyl) | 15 | 3.07 | 5017 (Partially decomposed) |
| 5,5'-Di(4-amino-phenyl)-2,2'-bis-(1,3,4-oxadiazolyl) | 15 | 3.26 | 4900 (Partially decomposed) |

As is made clear from the above results, when other diamines than piperazine are used, the dope thus obtained has too high of a viscosity and therefore is not suitable for spinning thereof.

What is claimed is:

1. A fiber-forming or filmforming aromatic polyamide consisting essentially of repeating units of the following formulae [I] and [II]:

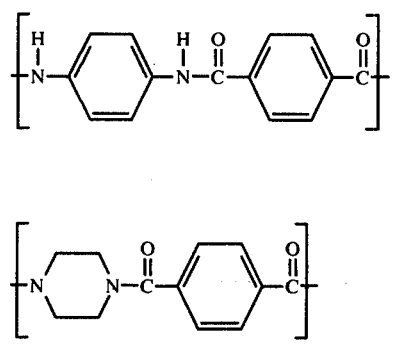

wherein the repeating units of the formula [II] are contained in said polyamide in the ratio of 10 to 35 molar % of the whole polymer, said polyamide being produced by polycondensing a mixed diamine consisting of piperazine and p-phenylenediamine with a substantially equimolar amount of terephthaloyl dihalide in at least one amide type polar solvent, said piperazine being employed in the ratio of 10 to 35 molar % on the basis of the whole diamine component.

2. The aromatic polyamide according to claim 1, wherein the repeating units of the formula [II] are contained in said polyamide in the ratio of 15 to 20 molar % of the whole polymer.

3. The aromatic polyamide according to claim 1, wherein the terephthaloyl dihalide is a member selected from the group consisting of terephthaloyl dichloride and terephthaloyl dibromide.

4. The aromatic polyamide according to claim 1, wherein the amide type polar solvent is a member selected from the group consisting of hexamethylphosphoramide, N-methyl-2-pyrrolidone, tetramethylurea, N,N-dimethylacetamide and mixtures thereof.

5. The aromatic polyamide according to claim 4, wherein the amide type polar solvent is a mixture of hexamethylphosphoramide and N-methyl-2-pyrrolidone in the ratio of 3 : 1 to 1 : 4.

6. The aromatic polyamide according to claim 1, wherein the polycondensation is carried out by dissolving the mixed diamine in the amide type polar solvent and adding to the resulting diamine solution the terephthaloyl dihalide with stirring and under cooling to −30° to 10° C and allowing them to react with each other.

7. The aromatic polyamide according to claim 6, wherein an acid acceptor selected from the group consisting of trimethylamine, triethylamine, pyridine, N-ethylpiperidine, N-methylpyrrolidine, N,N-dimethylbenzylamine, N-methylmorpholine, N-ethylmorpholine, 2,6-dimethylpyridine, N,N-dimethylaniline, N,N-diethylaniline, triallylamine, diallylmethylamine, allyldimethylamine, N-allylmorpholine, propargyldimethylamine, propargylmethyldimethylamine, propargylethyldimethylamine, dimethylethylamine, methyldiethylamine, dimethyl-n-propylamine, dimethyl-n-butylamine, dimethylisobutylamine, dimethylisopropylamine, tri-n-propylamine and tri-n-butylamine is added to the diamine solution in an amount of not more than 10 % by volume on the basis of the volume of the solvent.

8. A fiber formed from the aromatic polyamide as claimed in claim 1.

9. A fiber-forming aromatic polyamide as claimed in claim 1.

10. A film-forming aromatic polyamide as claimed in claim 1.

* * * * *